United States Patent
Obitsu

(10) Patent No.: US 6,851,066 B2
(45) Date of Patent: Feb. 1, 2005

(54) INFORMATION PROCESSING SYSTEM AND CONTROL METHOD

(75) Inventor: Toshiro Obitsu, Inagi (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 09/785,231

(22) Filed: Feb. 20, 2001

(65) Prior Publication Data

US 2002/0023236 A1 Feb. 21, 2002

(30) Foreign Application Priority Data

Aug. 18, 2000 (JP) ........................................ 2000-248235

(51) Int. Cl.[7] .................................................. G06F 1/28
(52) U.S. Cl. ...................... 713/323; 713/310; 348/207.1
(58) Field of Search ................................. 713/300, 310, 713/320, 323, 324; 348/207.1, 552

(56) References Cited

U.S. PATENT DOCUMENTS

| | | | | |
|---|---|---|---|---|
| 5,675,364 A | * | 10/1997 | Stedman et al. | 345/211 |
| 5,995,139 A | * | 11/1999 | Lee | 348/143 |
| 6,308,278 B1 | * | 10/2001 | Khouli et al. | 713/323 |
| 6,493,828 B1 | * | 12/2002 | Yamaguchi et al. | 713/324 |
| 6,665,805 B1 | * | 12/2003 | Tsirkel et al. | 713/323 |

FOREIGN PATENT DOCUMENTS

| | | | | |
|---|---|---|---|---|
| JP | 7-325639 | | 12/1995 | |
| JP | 11242733 A | * | 9/1999 | G06T/1/00 |

* cited by examiner

Primary Examiner—Thomas Lee
Assistant Examiner—Thuan Du
(74) Attorney, Agent, or Firm—Staas & Halsey LLP

(57) ABSTRACT

Disclosed is a technology of executing a resume mode of an information processing system and an imaging process of a subject when given an imaging indication from an imaging device even if the information processing system, to which the imaging device such as a digital camera etc is connected, is in a suspend mode. The information processing system (1) incorporates a shift function to the suspend mode and a restore function to the normal operation mode from the suspend mode, and interlocks with an imaging device. This system comprises a control unit (2, 3) for controlling the shift function and the restore function, a signal receiving unit (4) for receiving an imaging indication signal from said imaging device, and an imaging indication signal detection unit (9, 16) for starting the restore function when receiving the imaging indication signal in the suspend mode.

3 Claims, 5 Drawing Sheets

INFORMATION PROCESSING SYSTEM AND CONTROL METHOD

BACKGROUND OF THE INVENTION

The present invention relates to an information processing system such as a personal computer etc interlocking with an imaging device like a digital camera and so on.

Over the recent years, there have been spread information processing systems such as a notebook type personal computer (which will hereinafter be simply called a notebook PC) and a personal digital assistance (PDA) that are driven by a battery and easy to carry. Some types of notebook PCs have such an architecture that a CCD camera provided as an option is connected to the PC in order to take in a picture.

On the other hand, some of the battery-driven information processing systems incorporates a power management function working when not operated, and entering a suspend mode. In the suspend mode, the information processing system suspends an information processing function of a CPU etc, and hence it is required that the information processing system be restored to a normal operation mode in order to take in the picture (hereinafter, the restoration of the information processing system from the suspend mode to the normal operation mode is termed "resume").

For making the conventional information processing system resume, however, a dedicated resume button attached to the main body of the information processing system must be depressed. This kind of operation is troublesome to the user.

Particularly when the user wants to photograph quickly, the power management function of the information processing system is an obstacle to the quick photographing. Nevertheless, the user has a desire for avoiding a battery dissipation. None of the conventional information processing systems like the notebook PCs etc incorporating the power management function are, however, capable of satisfying such a contradictory request.

SUMMARY OF THE INVENTION

It is a primary object of the present invention, which was devised to obviate the problems inherent in the prior art, to provide a technology of executing a resume process of an information processing system and an imaging process of a subject when given an imaging indication from an imaging device even if the information processing system, to which the imaging device such as a digital camera etc is connected, is in a suspend mode.

To accomplish the above object, according to one aspect of the present invention, an information processing system incorporates a shift function to the suspend mode and a restore function to the normal operation mode from the suspend mode, and interlocks with an imaging device. This system comprises a control unit for controlling the shift function and the restore function, a signal receiving unit for receiving an imaging indication signal from said imaging device, and an imaging indication signal detection unit for starting the restore function when receiving the imaging indication signal in the suspend mode.

The imaging device given herein is, for example, a CCD camera, a MOS camera, a digital camera etc.

Further, the information processing system is, e.g., a personal computer, a personal digital assistance (PDA), a digital TV, a set-top box etc.

Moreover, the signal receiving unit may receive the signal via a cable or may wirelessly receive the signal.

Preferably, the control unit, when receiving the imaging indication signal in the suspend mode, may execute a shift from the suspend mode to the normal operation mode and a record of photographed-image data received immediately after the shift to the normal operation mode.

As discussed above, according to the present invention, even when the information processing system to which the imaging device like the CCD camera etc is connected is in the suspend mode, it is feasible to execute the resume process of the information processing system and an imaging process of a subject through an imaging indication given from the imaging device.

DETAILED DESCRIPTION OF THE PREFERRED EMBODIMENT

A preferred embodiment of the present invention will hereinafter be described with reference to FIGS. 1 through 5.

Figure 1:
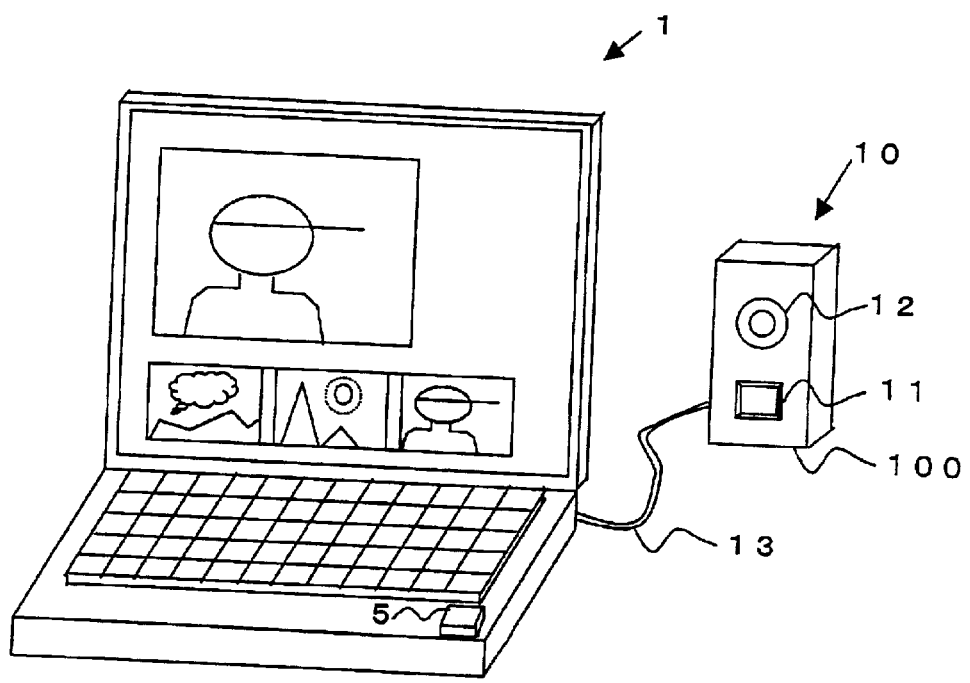
FIG. 1 is a view showing an external system configuration of a notebook PC 1 and a CCD camera 10 in an embodiment.
Figure 2:
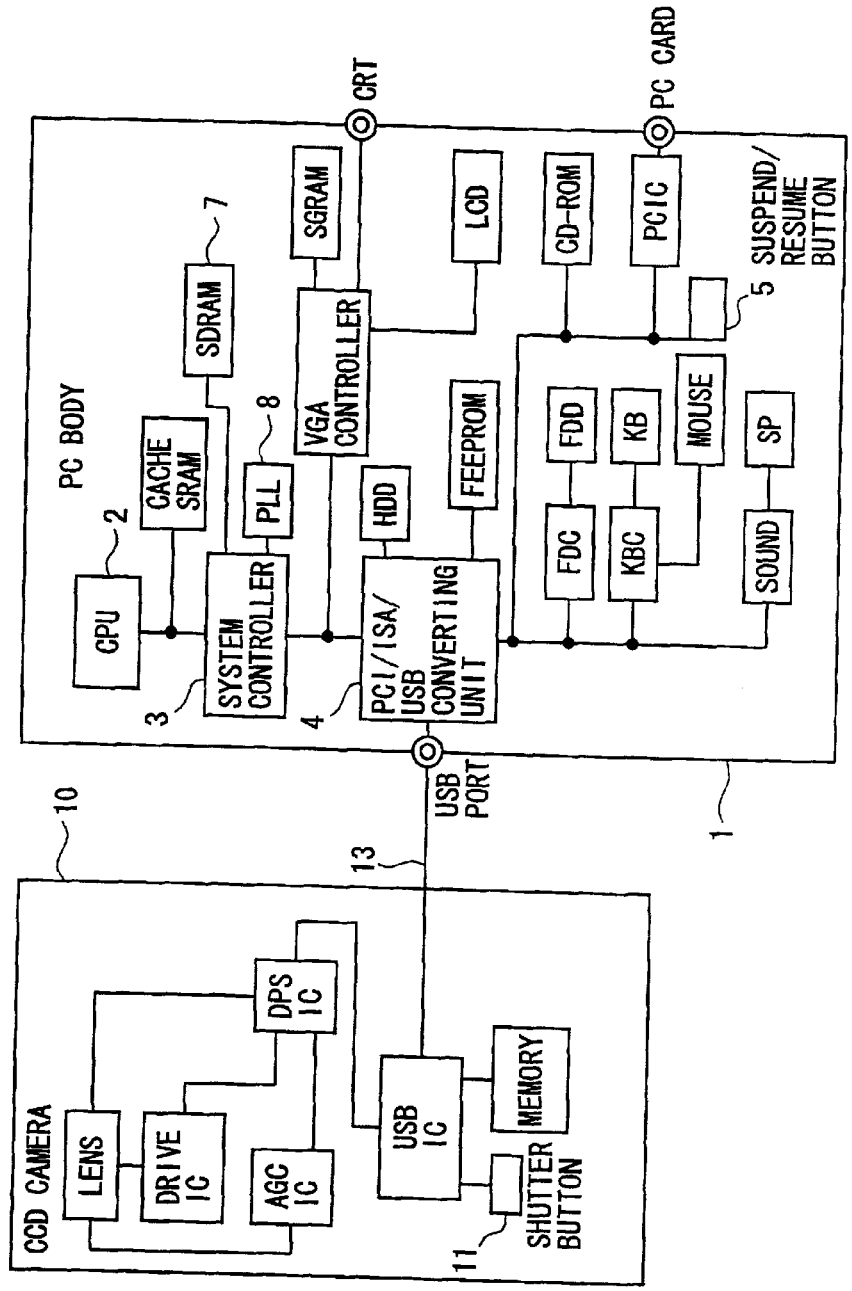
FIG. 2 is a diagram showing a hardware architecture of the notebook PC 1 and the CCD camera 10.
Figure 3:
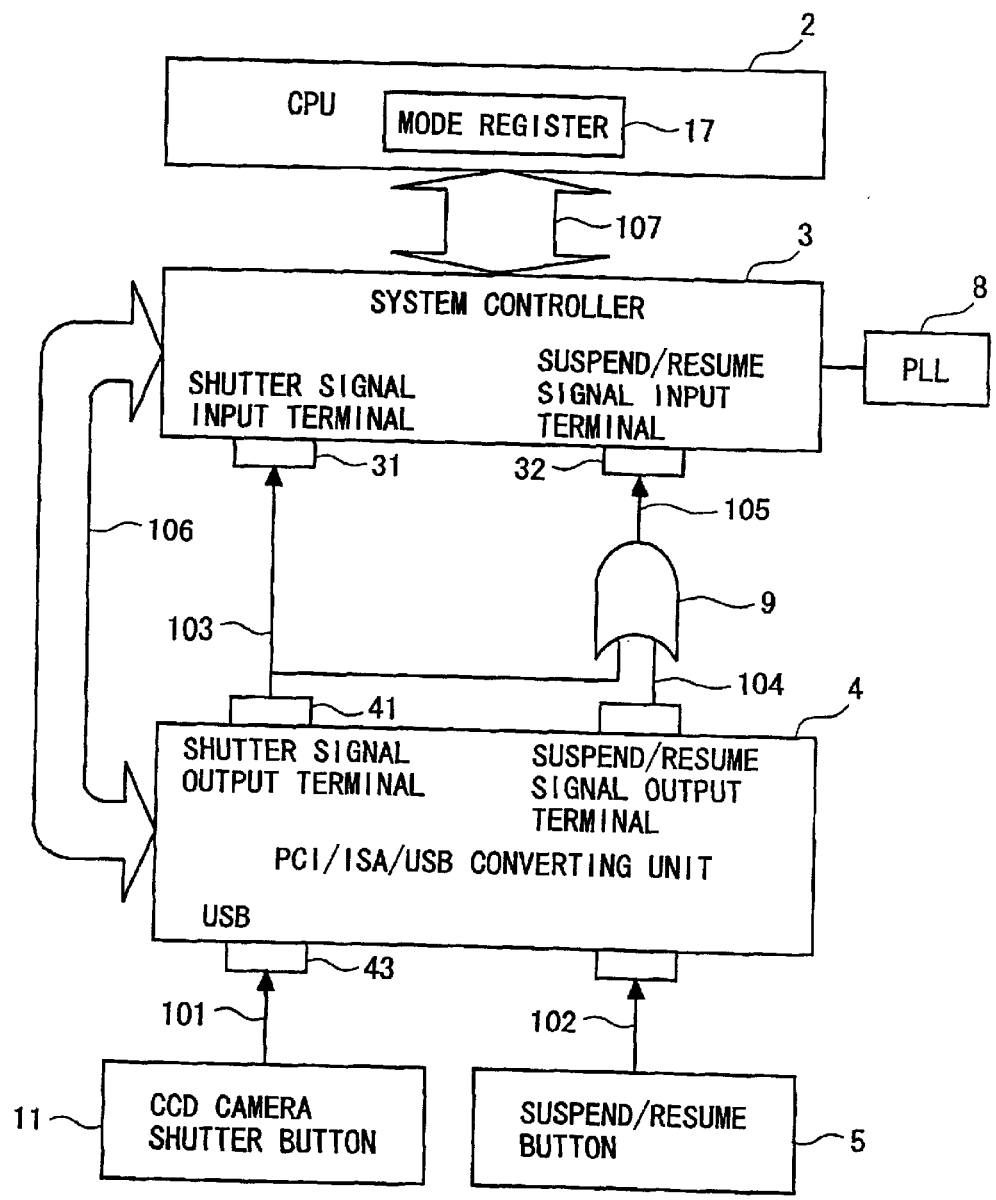
FIG. 3 is an explanatory diagram showing signals of a system controller 3 shown in FIG. 2.
Figure 4:
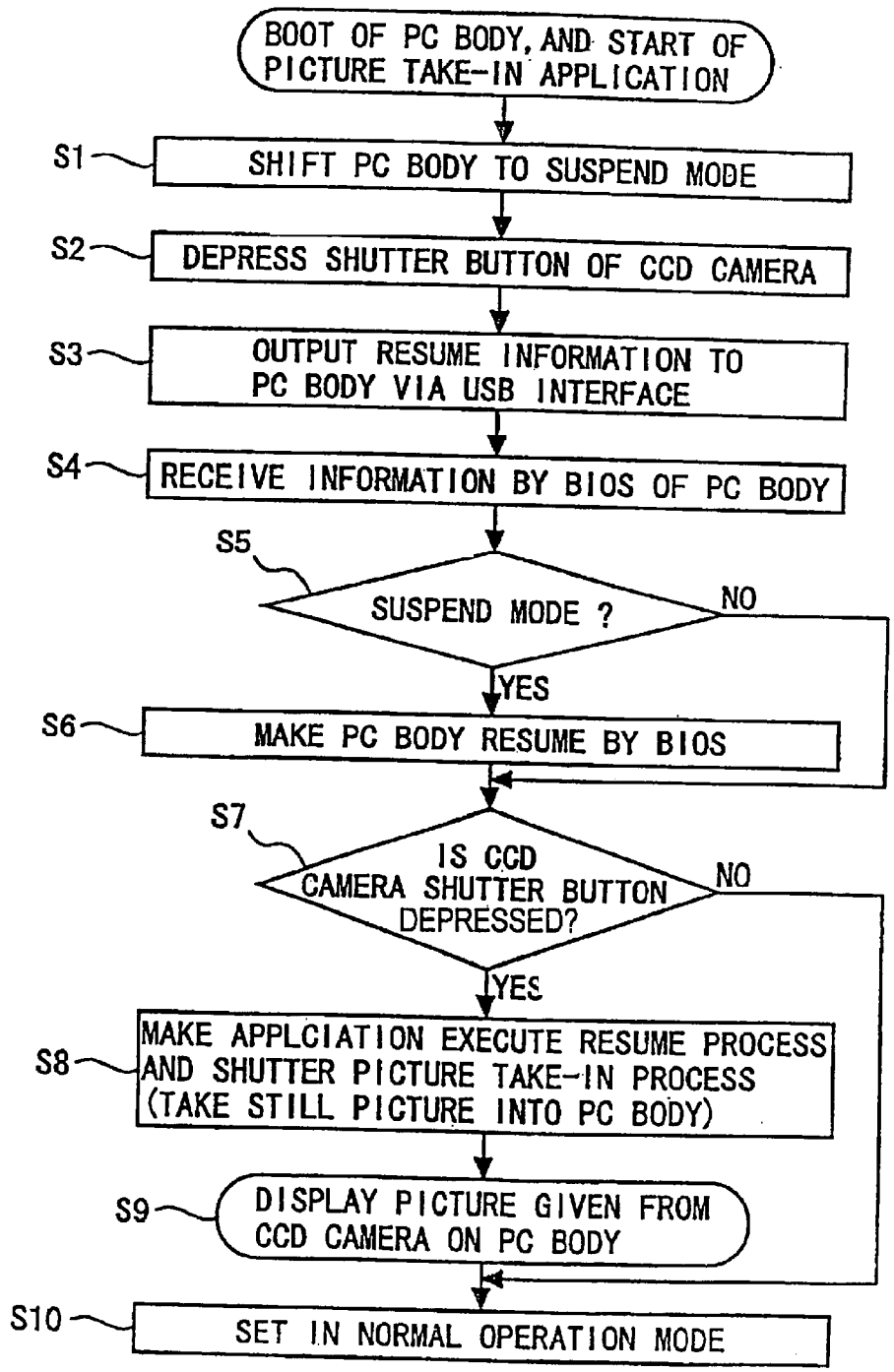
FIG. 4 is a flowchart showing a picture take-in process in the notebook PC 1.
Figure 5:
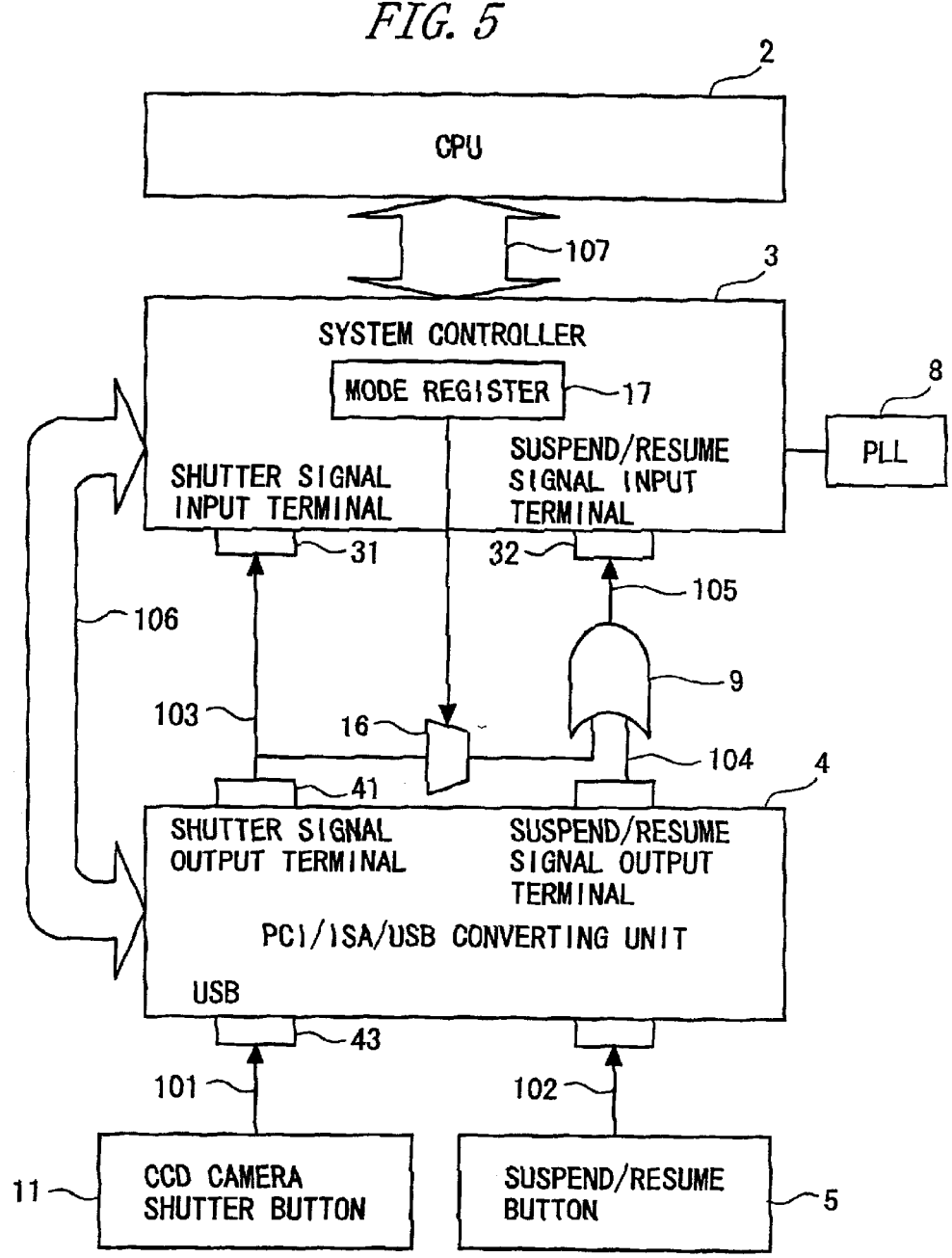
FIG. 5 is an explanatory diagram showing signals of the system controller 3 in a modified example of the embodiment.

FIG. 1 is a view showing an external system configuration of a notebook size personal computer (which will hereinafter simply called a notebook PC) 1 and a CCD camera 10. FIG. 2 is a diagram showing a hardware architecture of the notebook PC 1 and the CCD camera 10. FIG. 3 is an explanatory diagram showing signals of a system controller 3 shown in FIG. 2. FIG. 4 is a flowchart showing an image take-in process by the notebook PC 1. FIG. 5 is an explanatory diagram showing the signals of the system controller 3 in a modified example of this embodiment.

<Hardware Architecture>

FIG. 1 is the view illustrating the external system configuration of the notebook PC 1 and the CCD camera 10. The CCD camera 10 is connected via a USB (Universal Serial Bus) cable to a USB port of the notebook PC 1.

The CCD camera 10 includes a lens 12 and a shutter button 11. The CCD camera 10 generates image data in realtime in an unillustrated CCD imaging device.

The notebook PC1 has a liquid crystal display (LCD), a keyboard, and suspend/resume button 5. This notebook PC1, if not operated by a user for predetermined period of time, enters a suspend mode in order to save the power. The notebook PC 1 in the suspend mode is incapable of providing some of its original functions.

On the other hand, the notebook PC 1 transits between a normal operation mode and the suspend mode by use of the suspend/resume button 5. Namely, when the suspend/resume button 5 is depressed in the suspend mode, a normal operation mode is restored. Further, the notebook PC 1, when the suspend/resume button 5 is depressed in the normal operation mode, enters the suspend mode.

In the normal operation mode, the notebook PC 1 displays an image photographed by the CCD camera 10 in realtime on the liquid crystal display. Further, when a shutter button 11 is depressed, a signal indicating this depression is transmitted to the notebook PC 1. With this signal, the notebook PC 1 records an image taken in immediately after this in a predetermined memory area. This image recording corresponds to photographing by the CCD camera 10.

A characteristic of function of the notebook PC 1 is that when the shutter button is depressed in the suspend mode, the notebook PC 1 restores to the normal operation mode from the suspend mode, and further photographs the image.

FIG. 2 is the diagram showing the hardware architecture of the notebook PC 1 and the CCD camera 10. In the notebook PC 1, a clock signal is generated by PLL (Phase-Locked Loop) 8 as done in the general PC. This clock signal functions to drive each component, e.g., the CPU 2 etc of the notebook PC 1 through the system controller 3.

The notebook PC 1, when entering the suspend mode, suspends supplying clocks to the CPU 2 and displaying on the LCD. In the suspend mode, when the suspend/resume button 5 is depressed, a suspend/resume signal occurred upon this depression is transferred to the system controller 3. With this suspend/resume signal, the suspended clock supply and the suspended display on the LCD resume.

As shown in FIG. 2, the image data generated on the unillustrated CCD imaging device through the lens, are transferred to a USB (Universal Serial Bus) IC by a DSP (Digital Signal processor) IC. The image data are further transferred to the USB port of the notebook PC 1 via the USB cable 13 from the USB IC.

This USB port is connected to a USB input terminal of a PCI/ISA/USB converting unit 4. The PCI/ISA/USB converting unit 4 is an adapter for converting respective bus signals of PCI, ISA and USB into internal bus signals. The image data are transferred to the CPU 2 via the system controller 3 from PCI/ISA/USB converting unit 4. Thus, the CPU 2 takes in the image data, in real time, of the image photographed by the CCD camera 10.

The shutter signal occurred by the shutter button 11 is, as in the case of the image data, transferred to the CPU 2 on the same path from the USB IC via the same components as those described above. With this shutter signal, the CPU 2 records the image taken in just after this in a predetermined area on SDRAM 7.

<Explanation of Signals of System Controller 3>

FIG. 3 is the explanatory diagram showing the signals of the system controller 3. As shown in FIG. 3, the system controller 3 is connected via a 32-bit bus 107 to the CPU 2. Further, the system controller 3 is connected via a 32-bit bus 106 to the PCI/ISA/USB converting unit 4.

Further, the system controller 3 has a shutter signal input terminal 31 and is connected to a shutter signal output terminal 41 of the PCI/ISA/USB converting unit 4. A shutter signal 101 from the CCD camera 10 is inputted to a USB terminal 43 of the PCI/ISA/USB converting unit 4. The shutter signal 101 is converted into a shutter signal 103. This shutter signal 103 is outputted from a shutter signal output terminal 41 and transferred to the system controller 3.

The suspend/resume signal 102 occurred by the suspend/resume button 5 is similarly inputted to the PCI/ISA/USB converting unit 4 and converted into a suspend/resume signal 104.

As shown in FIG. 3, the shutter signal 103 and the suspend/resume signal 104 are inputted to an OR gate 9. An OR output from this OR gate 9 is inputted to a suspend/resume signal input terminal 32 of the system controller 3.

Accordingly, in the suspend mode, the system controller 3 executes resuming also when the shutter button 11 is depressed in addition to the case where the suspend/resume button 5 is depressed.

In the resume process, the system controller 3, to begin with, supplies PLL-based clocks to the CPU 2. Next, the system controller 3 transmits a resume command to the CPU 2 via the 32-bit bus 107.

This resume command has a parameter for indicating whether the resume mode is triggered by the suspend/resume signal 102 or by the shutter signal 101. The shutter signal input terminal 31 has no input of signal, and, if the signal is inputted to only the suspend/resume signal input terminal 32, the resume mode is triggered by the suspend/resume signal 102. If both of the shutter signal input terminal 31 and the suspend/resume signal input terminal 32 have the inputs of signals, the resume mode is triggered by the shutter signal 101.

As shown in FIG. 3, the CPU 12 incorporates a mode register 17. This mode register holds information for indicating whether the notebook PC 1 is at present in the normal operation mode or in the suspend mode. When the resume command is inputted in the suspend mode, the CPU 12 executes resuming.

The CPU 2, in the resume process triggered by the suspend/resume signal 102, executes a process of restoring the display in the LCD as usual, and thereafter enters the normal operation mode.

On the other hand, in the resume mode by the shutter signal 101, the CPU 2 photographs the image immediately after completing the resume process. Namely, the CPU 2 saves, in the predetermined area on the SDRAM 7, the data inputted to the 32-bit bus 107 immediately after accepting the resume command.

<Operation and Effect>

FIG. 4 is a flowchart showing a picture (image) take-in process executed by the notebook PC 1. When the main body of the notebook PC 1 is booted and when a picture take-in application is booted, the notebook PC 1 executes the process in FIG. 4.

In this process, if a user's operation is not detected for a predetermined period of time or longer, or when the suspend/resume button 5 is depressed, the main body of the notebook PC 1 enters the suspend mode (S1).

In this suspend mode, when a depression on the shutter button 11 is detected (S2), the resume information (the shutter signal 101) is outputted from the USB IC within the CCD camera 10 to the main body of the notebook PC 1(S3). With this process, as explained above, the shutter signals 103 are inputted to the shutter signal input terminal 31 and the suspend/resume signal input terminal 2 of the system controller 3. Then, the system controller 3 resumes the supply of the PLL-based clocks. Further, the system controller 3 inputs the resume command to the CPU 2.

Then, a BIOS (Basic Input/Output System) in the CPU 2 functions, and receives the resume command and the event that the shutter button 11 is depressed (S4).

Next, the BIOS judges from the content in the mode register 17 whether the present mode is the suspend mode or the normal operation mode (S5).

If not in the suspend mode at the present, the BIOS executes nothing and advances the control to S7. While on the other hand, if in the suspend mode, the BIOS executes the resume process in the main body of the notebook PC 1 (S6). In the resume process, the BIOS at first sets the mode in the mode resister 17 to the normal operation mode. Further, the BIOS resumes the display on the LCD, and so on. Thereafter, the BIOS advances the control to S7.

In S7, the BIOS reads the resume command, and judges from a parameter of this command whether the shutter button 11 of the CCD camera 10 is depressed (S7). If the shutter button 11 is not depressed, the BIOS sets the CPU to the normal operation mode (a standby mode for the user's operation) (S10).

While on the other hand, if the shutter button 11 is depressed, the CPU 2 shifts the control to the picture take-in application from the BIOS. The picture take-in application functions to take the image (picture) into the main body (the predetermined area of the SDRAM 7) of the notebook PC 1 (S8). The picture take-in application displays the taken-in picture on the main body (the LCD) of the notebook PC 1 (S9).

Thereafter, the picture take-in application sets the CPU to the normal operation mode (the standby mode for the user's operation) (S10).

As discussed above, the notebook PC 1, when the shutter button 11 is depressed in the suspend mode, reverts to the normal operation mode from the suspend mode, and takes in the picture immediately after depressing the shutting button 11. That is, during photographing, there is no necessity of depressing the suspend/resume button 5 for shifting the PC 1 to the normal operation mode from the suspend mode. It is therefore feasible for the user to photograph the picture by use of the CCD camera 10 quickly from the suspend mode.

<Modification of Method of Recognizing Suspend Mode>

In the embodiment discussed above, the CPU 2 is provided inside with the mode register 17 for indicating whether the notebook PC 1 is in the normal operation mode or in the suspend mode. The bios judges whether the CPU 2 should execute resuming or not. The embodiment of the present invention is not, however, limited to this architecture.

For example, as shown in FIG. 5, the mode register 17 may also be provided in the system controller 3. Further, a three-state buffer 16 is provided between the shutter button 103 and the OR gate 9, and the mode register may control it.

When the mode register 17 indicates the normal operation mode, the three-state buffer 16 comes to a high impedance state and does not permit the shutter signal 103 to pass through. On the other hand, in the suspend mode, the three-state buffer 16 becomes an active state and lets the shutter signal 103 through. As a result, only when in the suspend mode, the shutter signal 103 is transmitted to the OR gate 9. Accordingly, the resuming triggered by the shutter signal 103 is executed only when the notebook PC1 is in the suspend mode.

<Other Modified Examples>

The embodiment discussed above has exemplified the case where the immediate execution of the resume function is triggered by depressing the shutter button 11 in the notebook PC 1 in the suspend mode. The embodiment of the present invention is not, however, confined to the notebook PC1. For instance, the present invention can be embodied in a general information processing system having a power management function such as a desktop type PC, a personal digital assistance (PDA) to which the CCD camera 10 is connectable, a digital TV, a set-top and so on.

The embodiment discussed above has exemplified the case where the immediate execution of the resume function is triggered by depressing the shutter button 11 in the notebook PC 1 to which the CCD camera 11 is connected. The embodiment of the present invention is not, however, restricted to this architecture. In the case of using, e.g., a MOS camera involving the use of a MOS imaging device in place of the CCD camera 11, the resume function can be executed in the same way. The present invention can be embodied in the same way in a case where a digital video camera takes a motion picture.

In the embodiment discussed above, the notebook PC 1 is connected via the USB cable to the CCD camera. The embodiment of the present invention is not however, limited to such a connection mode. For instance, the signal of the shutter button 11 and the image data may be received by interfaces different from each other. For example, only the shutter signal of the shutter button 11 may be received by RS-232C, while the image data may be received by other interface, e.g., an interface of the PCI or a PC card interface.

Further, the notebook PC 1 may wirelessly receive the signal from the CCD camera. For instance, the notebook PC 1 and the CCD camera may include interfaces based on the Bluetooth Standard, whereby the signal of the shutter button 11 and the image data from the CCD camera may be transferred through the radio communications.

What is claimed is:

1. An information processing system incorporating a shift function to a suspend mode and a restore function to a normal operation mode from the suspend mode, and interlocking with an imaging device, comprising:
    a control unit controlling the shift function and the restore function;
    a signal receiving unit receiving an imaging indication signal from the imaging device;
    an indication unit receiving a restore indication from the suspend mode to the normal operation mode;
    a restore indication distinction unit which distinguishes a restore signal generated by receiving the restore indication from a restore signal generated by receiving the imaging indication signal; and an imaging control unit starting the restore function when the restore indication distinction unit distinguishes receiving the imaging indication signal in the suspend mode, and recording photographed-image data immediately after the shift to the normal operation mode.

2. A control method of controlling an information processing system incorporating a shift function to a suspend mode and a restore function to a normal operation mode from the suspend mode, and interlocking with an imaging device, comprising:

shifting the information processing system from the normal operation mode to the suspend mode;

restoring the information processing system from the suspend mode to the normal operation mode when a restore indication signal indicating restore to the normal operation mode from the suspend mode is received; and restoring the information processing system from the suspend mode to the normal operation mode when an imaging indication signal from an imaging device is received in the suspend mode, and recording photographed-image data immediately after restoring the information processing system to the normal operation mode.

3. A recording medium for recording programs for executing information processing system incorporating a shift function to a suspend mode and a restore function to a normal operation mode from the suspend mode and interlocking with an imaging device, comprising:

shifting the information processing system from the normal operation mode to the suspend mode;

restoring the information processing system to the suspend mode to the normal operation mode when a restore indication signal indicating restore to the normal operation mode from the suspend mode is received; and restoring the information processing system from the suspend mode to the normal operation mode when an imaging indication signal from an imaging device is received in the suspend mode, and recording photographed-image data immediately after restoring the information processing system to the normal operation mode.

* * * * *